US011755842B2

(12) United States Patent
Scott

(10) Patent No.: US 11,755,842 B2
(45) Date of Patent: Sep. 12, 2023

(54) NATURAL LANGUAGE PROCESSING FOR DESCRIPTIVE LANGUAGE ANALYSIS INCLUDING N-GRAM ANALYSIS OF NARRATIVE INFORMATION

(71) Applicant: The United States of America, as represented by the Secretary of the Navy, Crane, IN (US)

(72) Inventor: Alicia L Scott, Bloomington, IN (US)

(73) Assignee: The United States of America, as Represented by the Secretary of the Navy, Washington, DC (US)

(*) Notice: Subject to any disclaimer, the term of this patent is extended or adjusted under 35 U.S.C. 154(b) by 223 days.

(21) Appl. No.: 17/157,122

(22) Filed: Jan. 25, 2021

(65) Prior Publication Data
US 2021/0232772 A1    Jul. 29, 2021

Related U.S. Application Data

(60) Provisional application No. 62/964,837, filed on Jan. 23, 2020.

(51) Int. Cl.
| | | |
|---|---|---|
| *G06F 40/279* | (2020.01) | |
| *G06F 40/284* | (2020.01) | |
| *G06F 40/30* | (2020.01) | |
| *G06F 40/226* | (2020.01) | |

(52) U.S. Cl.
CPC ............ *G06F 40/30* (2020.01); *G06F 40/226* (2020.01); *G06F 40/284* (2020.01)

(58) Field of Classification Search
CPC ...... G06F 40/20; G06F 40/279; G06F 40/284; G06F 40/289; G06F 16/31; G06F 16/319; G06F 40/30
USPC ......... 704/1, 9; 707/723, 730, 750, 752, 754
See application file for complete search history.

(56) References Cited

U.S. PATENT DOCUMENTS

| | | | | |
|---|---|---|---|---|
| 5,991,714 A | * | 11/1999 | Shaner ................. | G06F 40/289 |
| | | | | 704/9 |
| 10,068,380 B2 | * | 9/2018 | Chang ................... | G06F 40/289 |
| 2004/0122657 A1 | * | 6/2004 | Brants .................. | G06F 40/131 |
| | | | | 704/9 |
| 2007/0050384 A1 | * | 3/2007 | Whang ................. | G06F 16/319 |
| 2009/0055358 A1 | * | 2/2009 | Tomasic .............. | G06F 16/3337 |
| 2016/0378435 A1 | * | 12/2016 | Danielson ............ | G06F 40/263 |
| | | | | 717/104 |
| 2017/0024376 A1 | * | 1/2017 | Eck ...................... | G06F 40/253 |
| 2017/0286978 A1 | * | 10/2017 | Govindarajan ... | G06F 16/24578 |
| 2018/0150739 A1 | * | 5/2018 | Wu ....................... | G06F 40/211 |
| 2019/0005049 A1 | * | 1/2019 | Mittal .................. | G06F 40/205 |
| 2019/0102374 A1 | * | 4/2019 | Tiwari ................. | G06F 40/284 |

(Continued)

*Primary Examiner* — Martin Lerner
(74) *Attorney, Agent, or Firm* — Naval Surface Warfare Center, Crane Division

(57) ABSTRACT

The present invention relates to a system that uses natural language processing (NLP) to read data from a file and analyze the data based on user defined parameters. According to an illustrative embodiment of the present disclosure, a system can process and analyze a data file by finding trending themes across data entries. According to a further illustrative embodiment of the present disclosure, the system can search for reoccurring words/phrases based on Ngrams (i.e. n-grams). The system can be adapted to search for Ngrams of varying length depending on the information sought and can sort the results by Ngram length.

4 Claims, 4 Drawing Sheets

(56) References Cited

U.S. PATENT DOCUMENTS

| | | | |
|---|---|---|---|
| 2020/0226325 A1* | 7/2020 | Mishra | G06F 40/284 |
| 2021/0089622 A1* | 3/2021 | Ng | G06F 40/289 |
| 2022/0342583 A1* | 10/2022 | Scott | G06F 40/30 |

* cited by examiner

TEXT EXAMPLE:
It was noted that the cam follower on the MTS SYSTEM was canted to one side and not all of the pieces were on it.
PROBLEM
The cam follower was canted and was missing hardware.
PROBABLE CAUSE Normal use/wear
Over time the cam follower on the MTS SYSTEM wore out.
ACTION TAKEN Problem Completely Corrected
When the cam follower was removed it was noted that the threads on the angle assy were bad.
The angle assy was replaced and new cam followers were install.

*FIG. 3*

TEXT EXAMPLE:
It was noted that the cam follower on the MTS SYSTEM was canted to one side and not all of the pieces were on it.
{ The cam follower was (canted) and was (missing hardware).
PROBABLE CAUSE Normal use/wear
Over time the cam follower on the MTS SYSTEM wore out.
ACTION TAKEN Problem Completely Corrected
When the cam follower was removed it was noted that the threads on the angle assy were (bad). }
The angle assy was replaced and new cam followers were install.

*FIG. 4*

| Entry | Engineer | Issue | Date Input | Description |
|---|---|---|---|---|
| 1 | A. Ludgate | | 1/3/2019 | Internet is down in the office. Please fix the internet. |
| 2 | T. Haverford | Fountain | 1/5/2018 | Spout is busted on the fountain. A new spout needs installed. |
| 3 | A. R. Ludgate | | 1/8/2019 | The copy machine won't make copies. Order a new copy machine. |
| 4 | AL | Andy | 1/10/2019 | Andy broke his arm. I am reporting Andy as broken. |
| 5 | T. Haverford | | 1/15/2019 | Internet is out because Jerry stepped on the router. Maintenance fixed the internet. |
| 6 | J. Gergich | Computer | 1/18/2019 | All the files are missing from my computer. |
| 7 | T. Haverford | Copy Machine | 1/30/2019 | The copy machine needs maintenance. Copy machine has been down for weeks. |
| 8 | T. Haverford | Internet | 2/1/2019 | Internet went out again. Internet was down for an hour. |
| 9 | A. Ludgate | | 2/2/2019 | The copy machine still won't make copies. Order new copy machine. |
| 10 | A. Dwyer | Water Fountain | 2/3/2019 | The water fountain spout isn't working. Need a spout. |

51

RESULTS:

1. Internet - 3

2. Copy Machine - 3

3. Spout - 2

NATURAL LANGUAGE PROCESSING FOR DESCRIPTIVE LANGUAGE ANALYSIS INCLUDING N-GRAM ANALYSIS OF NARRATIVE INFORMATION

CROSS REFERENCE TO RELATED APPLICATIONS

This application claims priority to U.S. Provisional Application Ser. No. 62/964,837 filed on Jan. 23, 2020 the disclosure of which is expressly incorporated herein by reference.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200,634) is assigned to the United States Government and is available for licensing for commercial purposes. Licensing and technical inquiries may be directed to the Technology Transfer Office, Naval Surface Warfare Center Crane, email: Cran_CTO@navy.mil.

FIELD OF THE INVENTION

The present invention relates to a system for processing and analyzing data.

BACKGROUND AND SUMMARY OF THE INVENTION

The present invention relates to a system that uses natural language processing (NLP) to read data from a file and analyze the data based on user defined parameters. When presented with a data file of potentially unknown or unfamiliar format, users have to manually read hundreds of lines of data to deduce information from a text entry description. For large and complicated files, this can take weeks of effort and time. This can also be prone to bias in trend only looking for the certain types of information. What is needed is an automated process to remove manual processing as well as give analytical results to assist a user in evaluating the data.

According to an illustrative embodiment of the present disclosure, a system can process and analyze a data file by finding trending themes across data entries. Exemplary embodiments are agnostic for type of data evaluated. The system works best with column and cell based data format where it can derive themes from separated text description entries.

According to a further illustrative embodiment of the present disclosure, the system can search for reoccurring words/phrases based on Ngrams (i.e. n-grams). The system can be adapted to search for Ngrams of varying length depending on the information sought and can sort the results by Ngram length.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIG. 3 shows an exemplary text segment undergoing NLP.

FIG. 4 shows an exemplary text segment undergoing NLP.

FIG. 5 shows an exemplary data segment after NLP.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
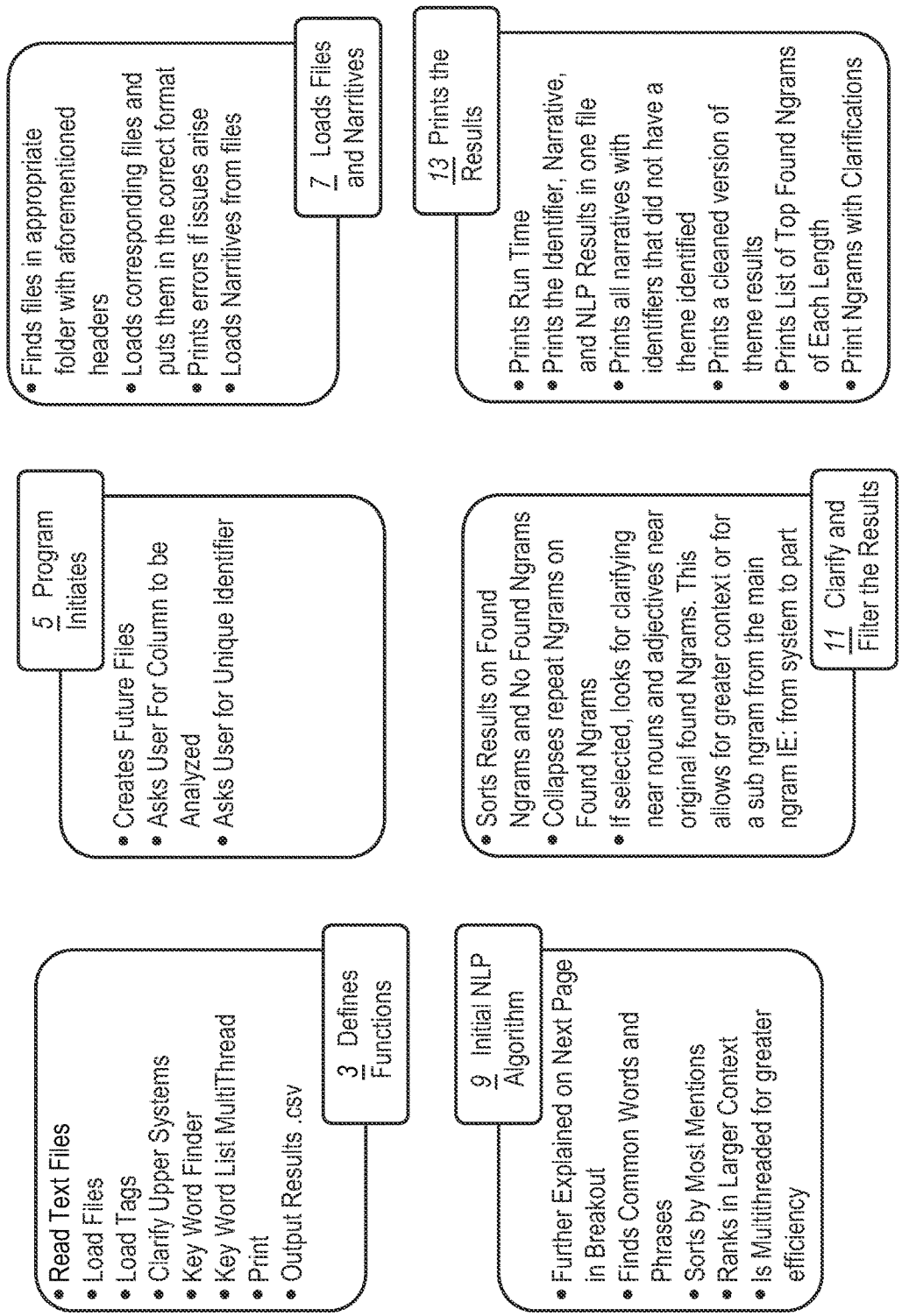
FIG. 1 shows an overview of the process steps for an exemplary system.
Figure 2:
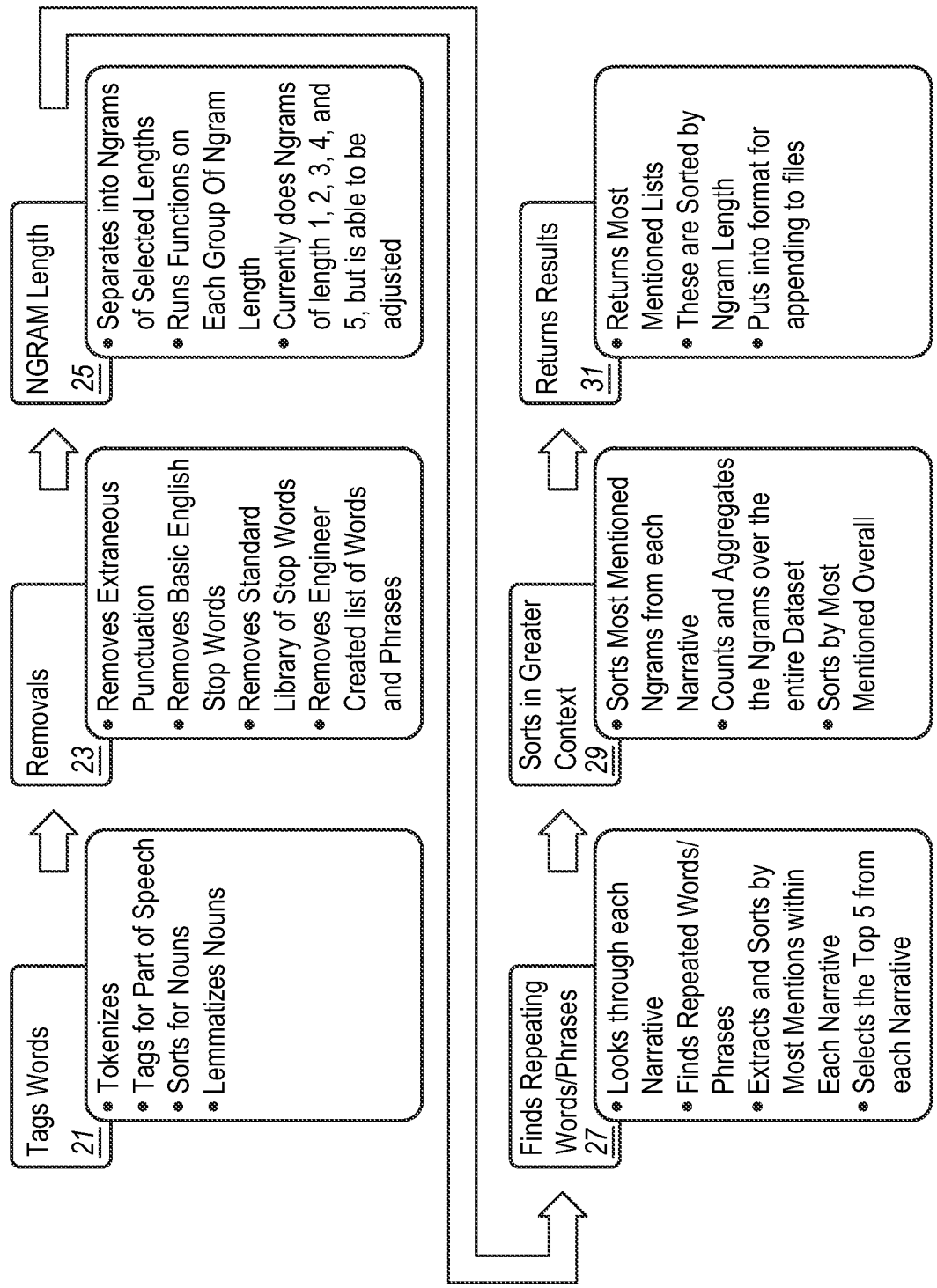
FIG. 2 shows an exemplary breakdown of the NLP functions.

FIG. 1 shows an overview of the process steps for an exemplary system 1. At 3, the system defines the functions that will be used. At 5, the system initiates. As part of this step, the system asks a user to specify a column to be analyzed (i.e., a narrative column identified by a narrative tag) and an identifier tag that identifies a particular file. The narrative column should be where descriptive text is located so that the system has the greatest chance of finding meaningful text. At 7, the system loads files and narratives. As part of this step, the system searches for files marked with the identifier tag, searches for columns marked with the narrative tag within the identified files, and extracts the narratives for processing. At 9, the system runs a first set of NLP algorithms (e.g., as shown in FIG. 2) on the narratives. This step includes finding common words or phrases, sorting the words of phrases by most mentions, and ranking the words or phrases by context. At 11, the system clarifies and filters the results. As part of the step, the system sorts any Ngrams found, collapses the results for repeat Ngrams, and optionally searches for clarifying nouns and adjectives near the found Ngrams in the original text. By searching for clarifying nouns and adjectives, a user can identify potential causes or issues related to the original search topic. At 13, the system outputs the results. As part of this step, the system can write the identifier tag, narrative, and NLP results to an output file. The consolidated nature of the output file allows a user to quickly and easily see the results of the system without needing to view or sort superfluous information.

FIG. 2 shows an exemplary breakdown of the NLP functions. At 21, the system tags words by tokenizing the text, tagging sections of text based on type (e.g., noun, verb, etc.), and lemmatizes nouns. At 23, the system removes various text, including removal of extraneous punctuation, removal of basic stop words (e.g., the, a, and), removal of a list of stop words (e.g., words that are known to be stop words based on the context), and removal of a user created list of stop words (e.g., user defined words that may be expected). At 25, the system separates the text into groups based on Ngram length. At 27, the system searches for repeating words/phrases in the text, extracts and sorts the words/phrases by most mentions within a particular entry, and selects a predetermined number (e.g., higher number if large entries) of words/phrases from each entry. By not limiting the search to predetermined words/phrases specific to the context, a user can also find trending themes. This can mitigate the bias by a human who is only looking for expected types of words/phrases. At 29, the system sorts the results across all of the entries, including sorting by most mentioned Ngrams from each entry, counting and aggregating the Ngrams across the entire dataset, and sorting by the most mentioned Ngrams throughout the entire dataset. At 31, the system returns the results including lists of most mentioned Ngrams sorted by Ngram length and outputs the results into a format for appending to files (e.g., adding an additional column in the original data file that lists the most reoccurring Ngrams for each row).

FIG. 3 shows an exemplary text segment undergoing NLP. In this example, "was" is identified as a basic stop word and will be removed from the analysis. "Problem" and "MTS SYSTEM" are context specific stop words that are expected to be in every entry, so they are removed from the analysis. The system then retrieves words/phrases with multiple mentions ("cam follower" and "angle assy"), which can then be sorted by most mentions and ranked in the larger context of the total data entries.

FIG. 4 shows an exemplary text segment continuing the NLP of FIG. 3. The system identifies connected noun/adjective phrases related to the previously identified words/phrases. The system creates an analysis file with a unique name, narrative field, and results of the NLP process. The system also creates a file of data entries that need manual intervention (e.g., no words/phrases were identified, no themes generated, etc.), and collapses the results within the analysis file.

FIG. 5 shows an exemplary data segment 51 after NLP. The system the retrieves words/phrases with multiple mentions ("internet", "copy machine", and "spout"), which are then sorted by most mentions and ranked in the larger context of the total data entries under the results 53. If a user discovers a word/phrase that is not related the intended purpose of the search, the user can add the word/phrase to the list of stop words (e.g., see FIG. 2). Words phrases not meeting a particular threshold (e.g., reoccurring across multiple data entries) can be excluded from the results (e.g., "Andy") to limit the results to words/phrases of higher importance.

Although the invention has been described in detail with reference to certain preferred embodiments, variations and modifications exist within the spirit and scope of the invention as described and defined in the following claims.

The invention claimed is:

1. A method of processing text comprising:
identifying at least one data file comprising narrative information, the narrative information comprising a plurality of data entries;
extracting the narrative information from the at least one data file;
applying a plurality of natural language processing (NLP) algorithms to the narrative information to generate NLP results, wherein the NLP algorithms comprise finding word level n-grams for a plurality of word level n-gram lengths and counting repeating n-gram instances within each data entry;
counting a number of repeating n-gram instances across the plurality of data entries;
sorting the NLP results for each n-gram based on the number of repeating n-gram instances across the plurality of data entries; and
outputting the NLP results to an output data file;
wherein sorting the NLP results for each n-gram based on the number of repeating n-gram instances across the plurality of data entries includes filtering the NLP results by collapsing the repeating n-grams and searching for clarifying nouns and adjectives near each found n-gram.

2. The method of claim 1, wherein the at least one data file comprises column and cell based data formatting including separated text description entries.

3. A natural language processing (NLP) system comprising:
a non-transitory computer readable storage medium operable for storing a plurality of machine readable computer instructions operable to control one or more elements of an NLP system comprising:
a first section of machine readable computer instructions adapted to initiate the NLP system;
a second section of machine readable computer instructions adapted to load data files into the system and extract narrative information from the data files;
a third section of machine readable computer instructions adapted to execute a plurality of NLP algorithms on the narrative information to generate NLP results including applying the plurality of natural language processing (NLP) algorithms to the narrative information to generate NLP results, wherein the NLP algorithms comprise finding word level n-grams for a plurality of word level n-gram lengths, counting repeating n-gram instances within each data entry of a plurality of data entries, and counting a number of repeating n-gram instances across the plurality of data entries;
a fourth section of machine readable computer instructions adapted to clarify and filter the NLP results including sorting n-grams found in the NLP results, collapsing the NLP results for repeating n-grams, and searching for clarifying nouns and adjectives near the found n-grams; and
a fifth section of machine readable computer instructions adapted to output the NLP results to an output file.

4. A method of processing text comprising:
providing a non-transitory computer readable storage medium operable for storing a plurality of machine readable computer instructions operable to control one or more elements of a Natural Language Processing (NLP) system comprising:
a first section of machine readable computer instructions adapted to initiate the NLP system;
a second section of machine readable computer instructions adapted to load data files into the NLP system and extract narrative information from the data files;
a third section of machine readable computer instructions adapted to execute a plurality of NLP algorithms on the narrative information to generate NLP results;
a fourth section of machine readable computer instructions adapted to clarify and filter the NLP results including sorting n-grams found in the NLP results, collapsing the NLP results for repeating n-grams, and searching for clarifying nouns and adjectives near the found n-grams; and
a fifth section of machine readable computer instructions adapted to output the NLP results to an output data file;
identifying at least one data file comprising narrative information, the narrative information comprising a plurality of data entries;
extracting the narrative information from the at least one data file;
applying the plurality of NLP algorithms to the narrative information to generate NLP results, wherein the NLP algorithms comprise finding word level n-grams for a plurality of word level n-gram lengths and counting repeating n-gram instances within each data entry;

counting a number of repeating n-gram instances across the plurality of data entries;

sorting the NLP results for each n-gram based on the number of repeating n-gram instances across the plurality of data entries; and outputting the NLP results to the output data file.

\* \* \* \* \*